(12) United States Patent
Kim

(10) Patent No.: US 9,405,361 B2
(45) Date of Patent: Aug. 2, 2016

(54) FLEXIBLE PORTABLE DEVICE

(75) Inventor: Yongsin Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 55 days.

(21) Appl. No.: 13/543,540

(22) Filed: Jul. 6, 2012

(65) Prior Publication Data

US 2013/0335311 A1    Dec. 19, 2013

(30) Foreign Application Priority Data

Jun. 14, 2012   (KR) .................. 10-2012-0063793

(51) Int. Cl.
*G06F 3/01* (2006.01)
*G06F 1/16* (2006.01)

(52) U.S. Cl.
CPC ............... *G06F 3/01* (2013.01); *G06F 1/1694* (2013.01); *G06F 2200/1614* (2013.01); *G06F 2200/1637* (2013.01)

(58) Field of Classification Search
CPC  G06F 3/01; G06F 1/1652; G06F 2203/04102
USPC ................................ 345/156–157, 173–178; 178/18.01–18.11
See application file for complete search history.

(56) References Cited

U.S. PATENT DOCUMENTS

| | | | |
|---|---|---|---|
| 7,443,380 B2 | 10/2008 | Nozawa | |
| 7,880,718 B2 | 2/2011 | Cradick et al. | |
| 2003/0227441 A1* | 12/2003 | Hioki et al. | 345/156 |
| 2004/0008191 A1 | 1/2004 | Poupyrev et al. | |
| 2007/0242033 A1* | 10/2007 | Cradick et al. | 345/156 |
| 2008/0303782 A1 | 12/2008 | Grant et al. | |
| 2009/0085866 A1* | 4/2009 | Sugahara | 345/156 |
| 2009/0219247 A1 | 9/2009 | Watanabe et al. | |
| 2010/0011291 A1* | 1/2010 | Nurmi | 715/702 |
| 2010/0030469 A1 | 2/2010 | Hwang et al. | |
| 2010/0117975 A1* | 5/2010 | Cho | 345/173 |
| 2010/0141605 A1 | 6/2010 | Kang et al. | |
| 2010/0201615 A1* | 8/2010 | Tupman et al. | 345/156 |
| 2011/0057873 A1 | 3/2011 | Geissler et al. | |
| 2011/0221667 A1* | 9/2011 | Lee | 345/156 |
| 2011/0227822 A1* | 9/2011 | Shai | 345/156 |
| 2012/0112994 A1 | 5/2012 | Vertegaal et al. | |
| 2012/0169609 A1 | 7/2012 | Britton | |
| 2012/0188153 A1* | 7/2012 | Tziortzis et al. | 345/156 |
| 2013/0044240 A1 | 2/2013 | Leskela et al. | |
| 2013/0201115 A1 | 8/2013 | Heubel | |
| 2014/0002402 A1 | 1/2014 | Kang et al. | |
| 2014/0068473 A1 | 3/2014 | Jano et al. | |

* cited by examiner

*Primary Examiner* — Amare Mengistu
*Assistant Examiner* — Stacy Khoo
(74) *Attorney, Agent, or Firm* — Birch, Stewart, Kolasch & Birch, LLP

(57) ABSTRACT

A flexible portable device is disclosed. The flexible portable device includes a display unit for displaying an image, a communication unit for performing communication with an external device, a sensor unit for sensing user input or an environment of the flexible portable device, and a control unit for controlling the flexible portable device and the units of the flexible portable device, wherein the sensor unit includes a motion sensor unit for sensing motion of the flexible portable device and/or motion with respect to the flexible portable device, the flexible portable device has at least one flexible area which is bendable, and the motion sensor unit is located at a first area at which influence on the motion sensor unit when the flexible area is bent is avoided or minimized.

11 Claims, 10 Drawing Sheets

FIG. 3
(a)
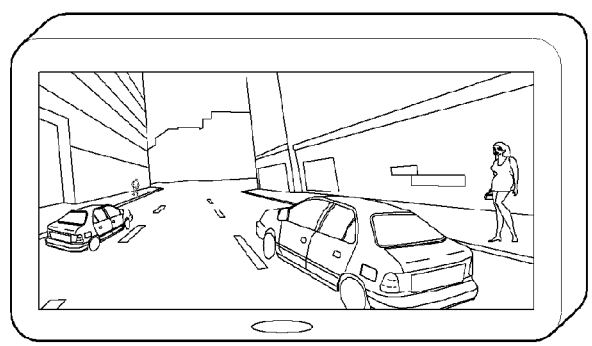
(b)
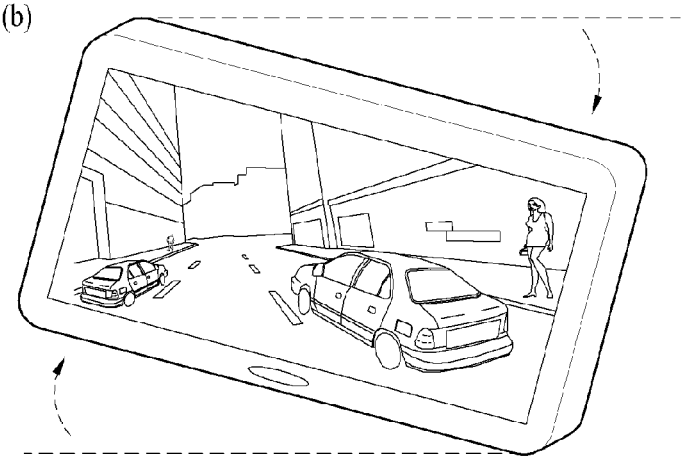
(c)
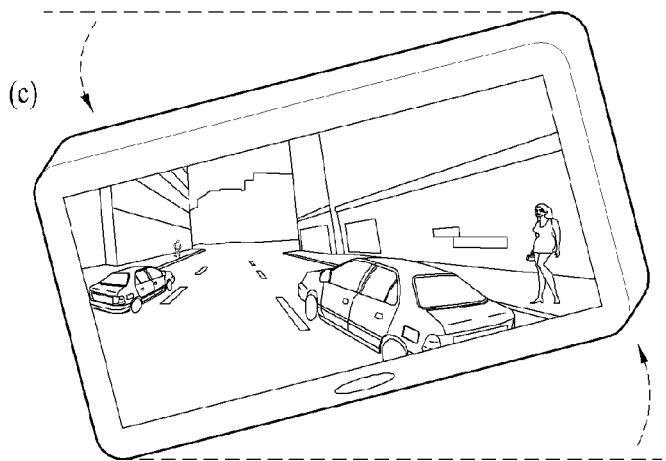

FIG. 4
(a)
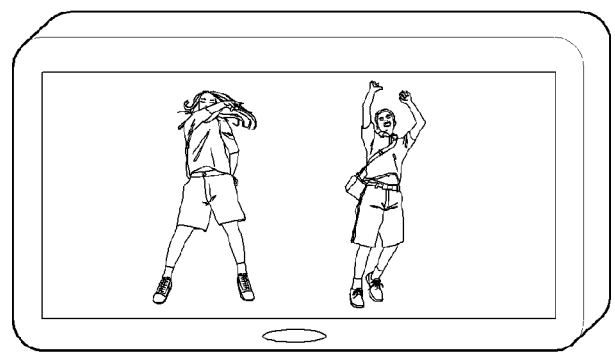
(b)
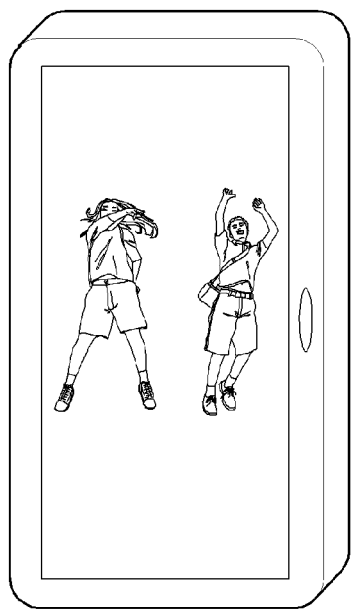
(c)
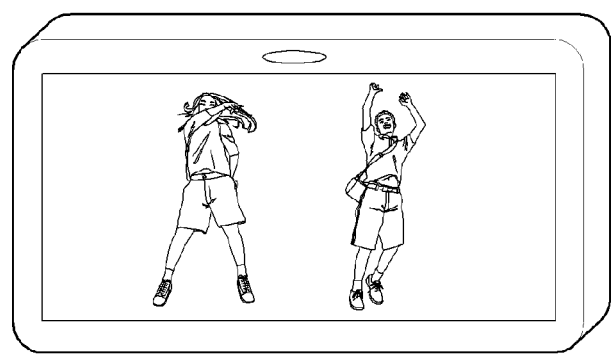

FIG. 7
(a)
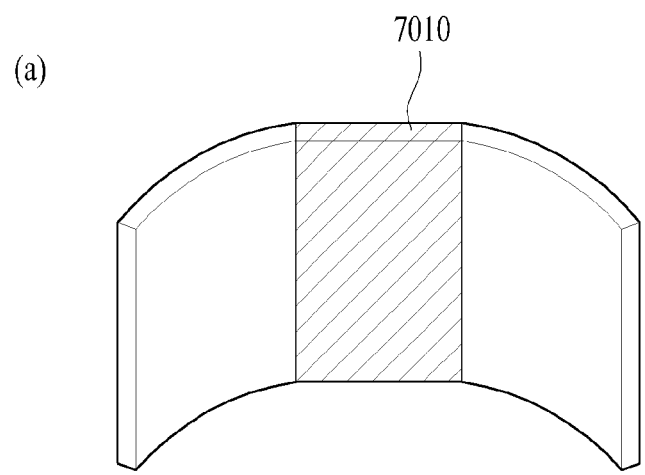
(b)
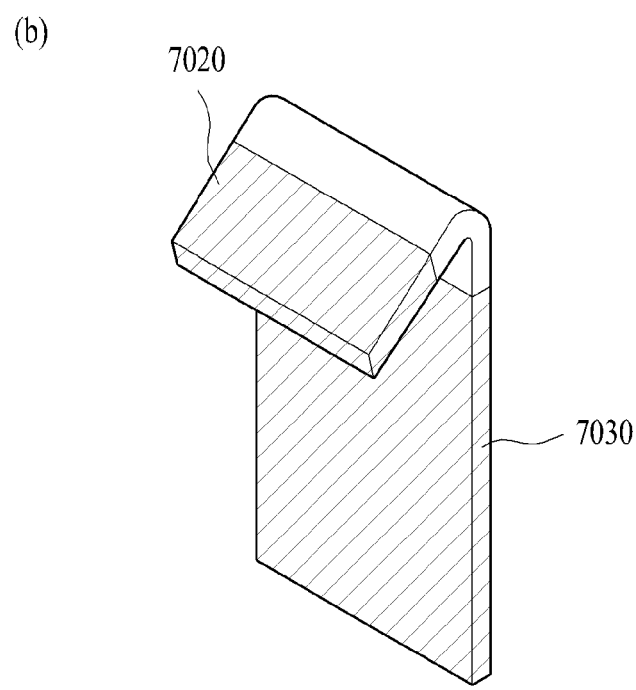

FIG. 8
(a)
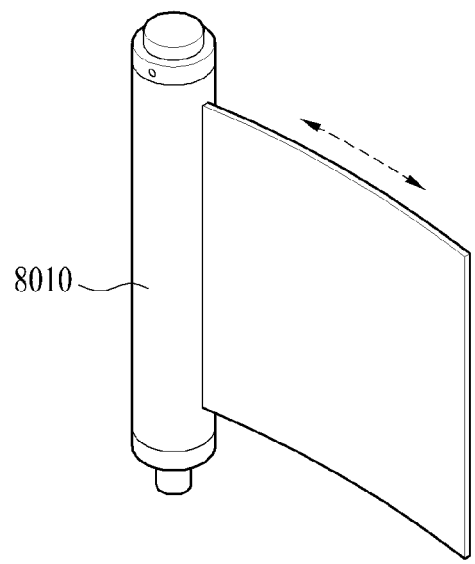
8010
(b)
8020
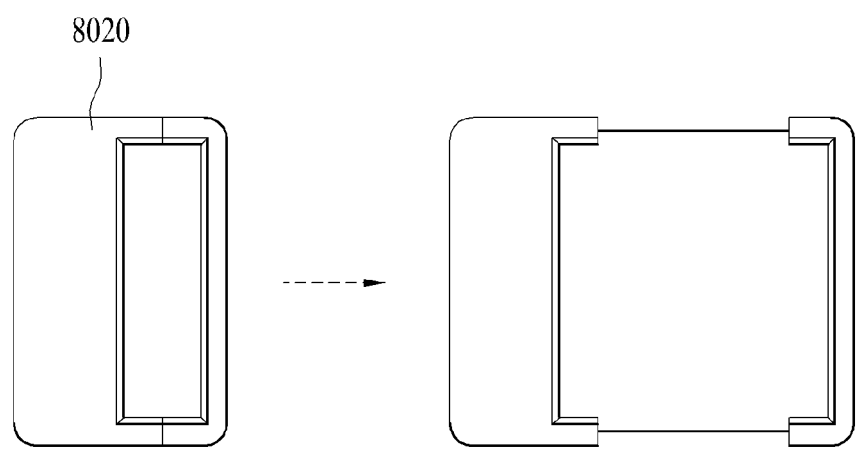

FIG. 9
(a)
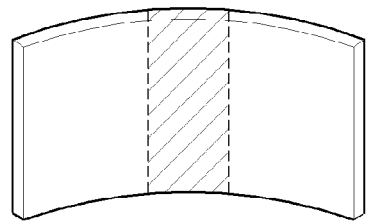
(b)
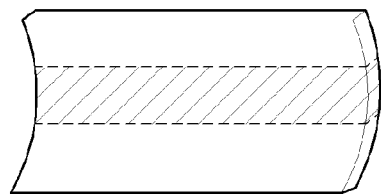
(c)
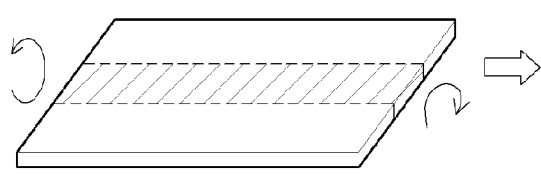
(d)
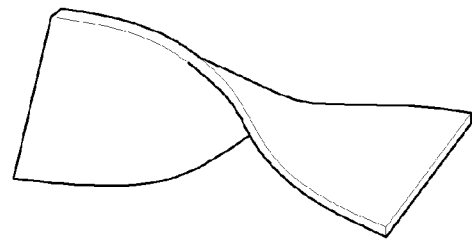
(e)
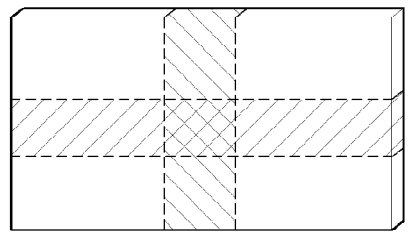
(f)
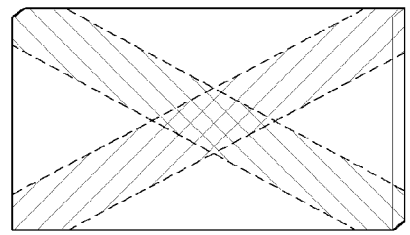

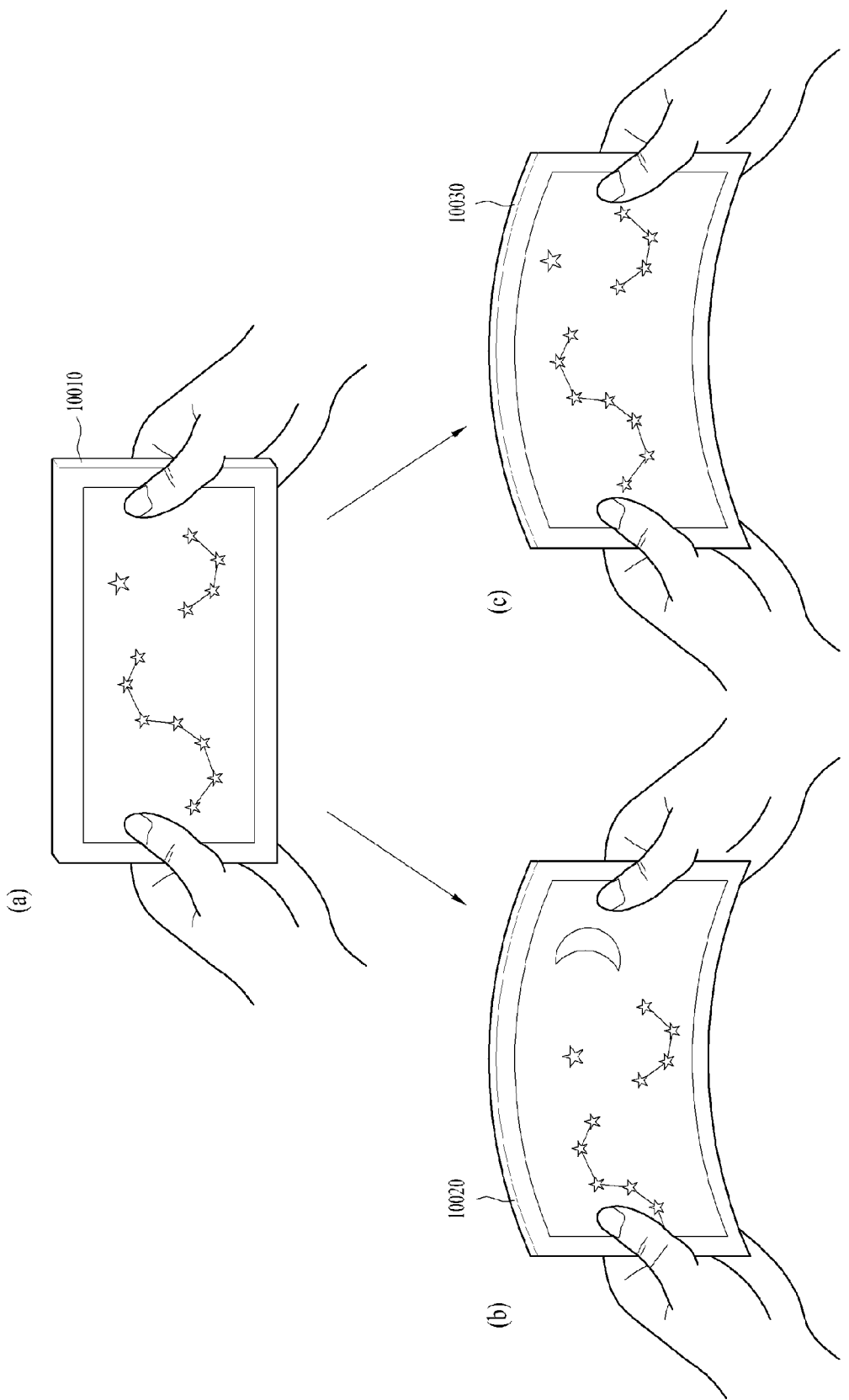

FLEXIBLE PORTABLE DEVICE

This application claims the benefit of Korean Patent Application No. 10-2012-0063793, filed on Jun. 14, 2012, which is hereby incorporated by reference as if fully set forth herein.

BACKGROUND OF THE INVENTION

1. Field of the Invention

The present invention relates to a flexible portable device, and more particularly, to a flexible portable device which includes a flexible display or is configured to be flexible.

2. Discussion of the Related Art

Mobility is an important factor when users use electronic instruments. In recent years, various portable electronic devices having the same performance as a desktop computer as well as a mobile phone have come onto the market. Such portable electronic devices have reduced size and weight so that users can use various kinds of electronic information during movement of the users.

Such portable devices perform various functions in addition to basic functions, such as conventional data transmission and reception. For this reason, it is necessary for users to more conveniently and accurately control the devices. In particular, recent portable devices include various sensors for recognizing the operation of each of the devices and the operation with respect to each of the devices so that the device can be controlled based thereupon. Also, sensitivity and recognition degree of the sensors have been increasingly improved with advances in technology, and method and applications for controlling the device using the sensors have been diversified.

SUMMARY OF THE INVENTION

Accordingly, the present invention is directed to a flexible portable device that substantially obviates one or more problems due to limitations and disadvantages of the related art.

An object of the present invention is to provide a portable device that can be more conveniently and accurately controlled by a user.

Another object of the present invention is to provide a portable device including a motion sensor, wherein a sensing error caused due to flexibility of the portable device can be minimized in a case in which the portable device includes a flexible display or a portion or the entirety of the portable device is flexible.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a flexible portable device includes a display unit for displaying an image, a communication unit for performing communication with an external device, a sensor unit for sensing user input or an environment of the flexible portable device, and a control unit for controlling the flexible portable device and the units of the flexible portable device, wherein the sensor unit includes a motion sensor unit for sensing motion of the flexible portable device and/or motion with respect to the flexible portable device, the flexible portable device has at least one flexible area which is bendable, and the motion sensor unit is located at a first area at which influence on the motion sensor unit when the flexible area is bent is avoided or minimized.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a view showing a display control operation of the portable device according to an embodiment of the present invention;

FIG. 4 is a view showing a display control operation of the portable device according to another embodiment of the present invention;

FIG. 7 is a view showing a portable device according to an embodiment of the present invention;

FIG. 8 is a view showing a portable device according to another embodiment of the present invention;

FIG. 9 is a view showing a portable device according to another embodiment of the present invention; and FIG. 10 is a view showing a control operation of a device according to a further embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Although most terms of elements in this specification have been selected from general ones widely used in the art taking into consideration functions thereof in this specification, the terms may be changed depending on the intention or convention of those skilled in the art or the introduction of new technology. Some terms have been arbitrarily selected by the applicant and their meanings are explained in the following description as needed. Thus, the terms used in this specification should be construed based on the overall content of this specification together with the actual meanings of the terms rather than their simple names or meanings.

With advances in electronic device manufacturing technology, digital devices have been miniaturized. The present invention relates to a portable electronic device, which will hereinafter be referred to as a portable device. The portable device includes various electronic devices having mobility. Examples of the portable device may include a mobile phone, personal digital assistant (PDA), laptop computer, tablet PC, MP3 player, CD player, and DVD player. Hereinafter, the portable device may be simply referred to as a device.

Figure 1:
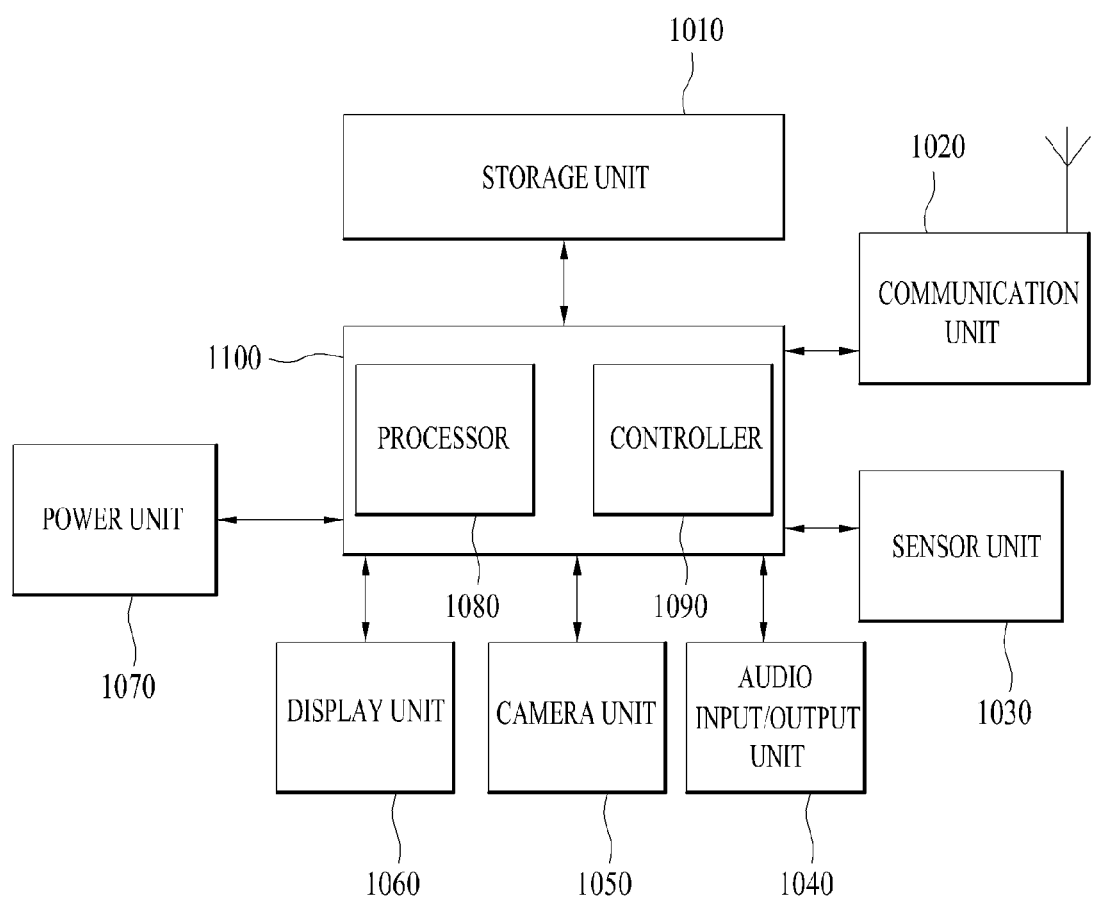
FIG. 1 is a block diagram showing a portable device according to an embodiment of the present invention.

FIG. 1 is a block diagram showing a portable device according to an embodiment of the present invention. As shown in FIG. 1, the portable device includes a storage unit 1010, a communication unit 1020, a sensor unit 1030, an audio input/output unit 1040, a camera unit 1050, a display unit 1060, a power unit 1070, a processor 1080, and a controller 1090.

The storage unit 1010 may store various kinds of digital data, such as videos, audio, pictures, motion pictures, and applications. The storage unit 1010 may be realized by various kinds of digital data storage devices, such as a flash memory, hard disk drive (HDD), and solid state drive (SSD).

The communication unit 1020 may communicate with an external network using various protocols. That is, the communication unit 1020 may transmit/receive data to/from the external network. For example, the communication unit 1020 may be connected to the external network in a wired or wireless fashion to transmit/receive digital data to/from the external network.

The sensor unit 1030 recognizes various input of a user or an environment of the portable device through a plurality of sensors mounted to the portable device, and transmits the recognized result to the controller 1090. The sensor unit 1030 may include a plurality of sensing devices. In an embodiment, the sensing devices may include a gravity sensor, geomagnetic sensor, motion sensor, gyro sensor, acceleration sensor, inclination sensor, brightness sensor, altitude sensor, olfactory sensor, temperature sensor, depth sensor, pressure sensor, bending sensor, audio sensor, video sensor, global positioning system (GPS) sensor, and touch sensor. The sensor unit 1030 commonly refers as various sensors specified above. The sensor unit 1030 may sense various inputs of a user and an environment of the portable device and transmit the sensed result to the portable device so that the portable device can perform an operation based on the sensed result. The sensors may be included in the portable device as separate elements or as at least one incorporated element.

The audio input/output unit 1040 includes an audio output device, such as a speaker, and an audio input device, such as a microphone. Audio may be output from the portable device through the audio input/output unit 1040. Also, an audio may be input to the portable device through the audio input/output unit 1040. The audio input/output unit 1040 may be used as the audio sensor.

The camera unit 1050 may take a picture and a motion picture. According to embodiments, the camera unit 1050 may be selectively provided. The camera unit 1050 may be used as the motion sensor or the video sensor.

The display unit 1060 may output an image to a display screen. In a case in which a touch sensitive display is used as the display, the display unit 1060 may be used as the touch sensor. In a case in which the display or the portable device is flexible, on the other hand, the display unit 1060 may be used as the bending sensor.

The power unit 1070 is a power source connected to a battery in the portable device or to an external power supply. The power unit 1070 may supply power to the portable device.

The processor 1080 may execute various applications stored in the storage unit 1010, and may process data in the portable device.

The controller 1090 may control the above-mentioned units of the portable device, and may control transmission and reception of data between the units and operations of the respective units.

The processor 1080 and the controller 1090 may be integrated into a single chip which simultaneously performs the operation of the processor 1080 and the operation of the controller 1090. In this case, the processor 1080 and the controller 1090 integrated into a single chip may hereinafter be referred to as a control unit 1100.

FIG. 1 is a block diagram showing the portable device according to the embodiment of the present invention. Several blocks are separately shown to logically distinguish between the elements of the portable device. Consequently, the elements of the portable device may be integrated into a single chip or a plurality of chips depending upon a design of the portable device.

In recent years, a portable device includes various sensors for recognizing various motions of the portable device. As the motions of the portable device are recognized, the portable device may be used in various ways in addition to basic functions, such as transmission and reception of data and a display function. For example, various applications and programs, such as a remote controller for controlling an external instrument and a game pad used to enjoy games, have been proposed in connection with motions that can be recognized by the portable device.

Also, only the shape of the portable device may hereinafter be shown and described with the detailed construction of the portable device being omitted. Even in this case, it should be understood that the portable device includes at least one of the elements as shown in FIG. 1.

Figure 2:
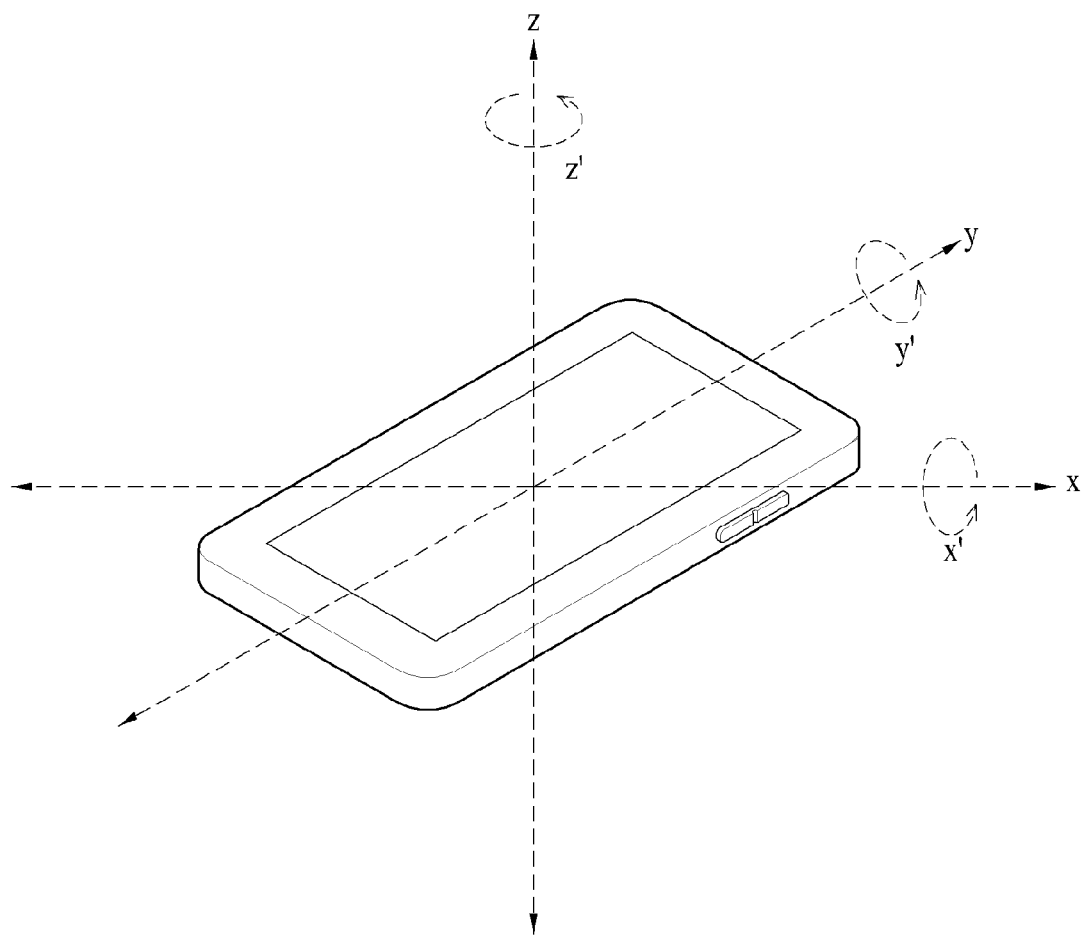
FIG. 2 is a view showing the portable device according to the embodiment of the present invention.

FIG. 2 is a view showing the portable device according to the embodiment of the present invention.

Movement or an environment of the portable device may be sensed/recognized using the plurality of sensors, as previously described. Hereinafter, movement of the portable device recognized by the sensors included in the sensor unit of FIG. 1 will be described.

The portable device may include a gravity sensor. The gravity sensor may sense gravity applied to the portable device to recognize whether the portable device has been rotated with respect to the surface of the earth and a rotational angle of the portable device in a case in which the portable device has been rotated with respect to the surface of the earth. When the portable device is rotated about an x axis or a y axis as shown in FIG. 2, the gravity sensor may transmit an electric signal based on the rotation to the controller, and the controller may control the display/operation of the portable device according to the rotation of the portable device.

The gravity sensor may be used as a tilt angle sensor. The tilt angle sensor detects a tilt of the portable device in the direction of the earth's gravity. The tilt angle sensor includes a sensor configured so that a pendulum is mounted to an angle input axis of an angle sensor. In an embodiment, the sensor may be classified as a displacement type sensor for directly outputting an angle from a reference axis of the pendulum indicating the direction of gravity or a torque balance type sensor for balancing torque generated when an electromagnetic wave is supplied to an electronic coil and torque generated by a tilt so that the pendulum can always be located at a zero position.

The portable device may include a geomagnetic sensor. The geomagnetic sensor senses the flow of a magnetic field generated in the earth to detect an azimuth like a compass. As shown in FIG. 2, the geomagnetic sensor may sense an azimuth of the portable device on an x-y plane thereof, and the display/operation of the portable device may be controlled according to the sensed result.

The portable device may include an acceleration sensor. The acceleration sensor may process an output signal to measure dynamic force, such as acceleration, vibration, and impact, of an object. In other words, the acceleration sensor may sense change in acceleration of the object in a specific direction, and may output the sensed result as an electric signal. As shown in FIG. 2, the acceleration sensor may detect the movement of the portable device in an arbitrary direction. For example, when force is applied to the portable device, which is stopped or being moved, to accelerate the portable device in a specific direction, the acceleration sensor senses the movement of the portable device and outputs the sensed result as an electric signal, and the display or operation of the portable device is controlled according to the electric signal. In the embodiment of the present invention, the acceleration sensor may sense acceleration in an arbitrary x, y, or z axis direction and change of the acceleration.

The portable device may include a gyro sensor. The gyro sensor senses an angle by which an object is rotated per unit time. In other words, the gyro sensor senses acceleration of the object. The above-mentioned acceleration sensor senses acceleration of an object in a straight direction and change of the acceleration, whereas the gyro sensor senses acceleration of an object in a rotational direction and change of the acceleration. In a case in which the portable device is rotated about an arbitrary x, y, or z axis as shown in FIG. 2, the gyro sensor may sense rotational acceleration of the portable device, and may output the sensed rotational acceleration of the portable device as an electric signal. The display/operation of the portable device may be controlled based on the acceleration.

The above-mentioned sensors are embodiments of sensors which may be included in the portable device. That is, the sensors are embodiments of sensors that are capable of sensing motion of the portable device or motion of a user or an environment with respect to the portable device. Hereinafter, such sensors, i.e. sensors that are capable of sensing motion of a user or motion of an environment with respect to the portable device and motion of the portable device and processing the sensed motion into an electric signal, may be referred to as a motion sensor. The motion sensor may include other sensors that are capable of sensing motion of a user or an environment with respect to the portable device and motion of the portable device and processing the sensed motion into an electric signal in addition to the gravity sensor, geomagnetic sensor, acceleration sensor, and gyro sensor. According to embodiments, the above-mentioned sensors corresponding to the motion sensor may be included in the portable device as a single chip or a plurality of chips.

FIG. 3 is a view showing a display control operation of the portable device according to an embodiment of the present invention.

FIG. 3(a) shows that an image of a game application is displayed on a display screen provided at the front of the portable device. During display of the image, a user may rotate the portable device in the clockwise direction or in the counterclockwise direction as shown in FIG. 2. In particular, in a car driving game as shown in FIG. 3, an advancing direction of the car in the image is controlled according to the rotation of the portable device. That is, a user may rotate the portable device like a steering wheel of the car to control the advancing direction of the car in the image. In this case, if the entirety of the image is rotated with the portable device, it is not possible for the user to view the image in a horizontal state. As shown in FIG. 3, therefore, rotational inclination and acceleration of the portable device may be sensed, the sensed result may be reflected in the game, and, at the same time, the display image may be controlled.

FIG. 3(b) shows a case in which the user rotates the portable device in the clockwise direction. A rotational angle and angular velocity of the portable device may be sensed by a motion sensor, and the image may be displayed horizontally with respect to the user based on the sensed result. That is, the display image is rotated in the direction opposite to the direction in which the portable device is rotated, and therefore, it is possible for the user to continue to view the image in a horizontal state irrespective of the rotation of the portable device. Also, the rotational angle and angular velocity of the portable device may be sensed by the motion sensor, and the sensed result may be reflected in the game application. In other words, the game application, which is driven by the processor of the portable device, may display the car in the game in a state in which the driving of the car is controlled using the rotational angle and angular velocity of the portable device sensed by the motion sensor.

FIG. 3(c) shows a case in which the user rotates the portable device in the counterclockwise direction. Except for the rotational direction of the portable device, the portable device is controlled in the same manner as shown in FIG. 3(b).

FIG. 4 is a view showing a display control operation of the portable device according to another embodiment of the present invention.

FIG. 4(a) shows that an image is displayed on a display screen provided at the front of the portable device. During display of the image, a user may rotate the portable device in the counterclockwise direction as shown in FIG. 2 or may be turned over in an arbitrary direction.

FIG. 4(b) shows a case in which the portable device is rotated by 90 degrees in the clockwise direction, and FIG. 4(c) shows a case in which the portable device is rotated by 180 degrees in the clockwise direction or in the counterclockwise direction. A rotational angle and turnover of the portable device may be sensed by a motion sensor. Consequently, the display of the portable device may be controlled in response to the rotational angle and turnover of the portable device. That is, the display image may be rotated or turned over so that the display image can be displayed in parallel to the direction in which the user holds the portable device.

In recent years, a flexible display has been commercialized, and technology of controlling the operation of a flexible device according to bending of the flexible display has been realized. For the flexible device, even a substrate of the flexible device is made of a flexible material so that the device can be bent. For the flexible device, the substrate may be made of metal foil, very thin glass, or plastic. Particularly for the plastic substrate, a polycarbonate (PC) substrate, polyethylene terephthalate (PET) substrate, polyethersulfone (PES) substrate, polyimde (PI) substrate, polyethylene naphthalate (PEN) substrate, or AryLite substrate may be used. In this specification, a device, a portion or the entirety of which is flexible, such as a device including a flexible display, a device the entirety of which is flexible, a device a portion of which is flexible, and a device provided with a flexible display so that the display is extended, may be referred to as a flexible portable device. For the convenience of description, the flexible portable device may be referred to as a portable device or a device.

Figure 5:
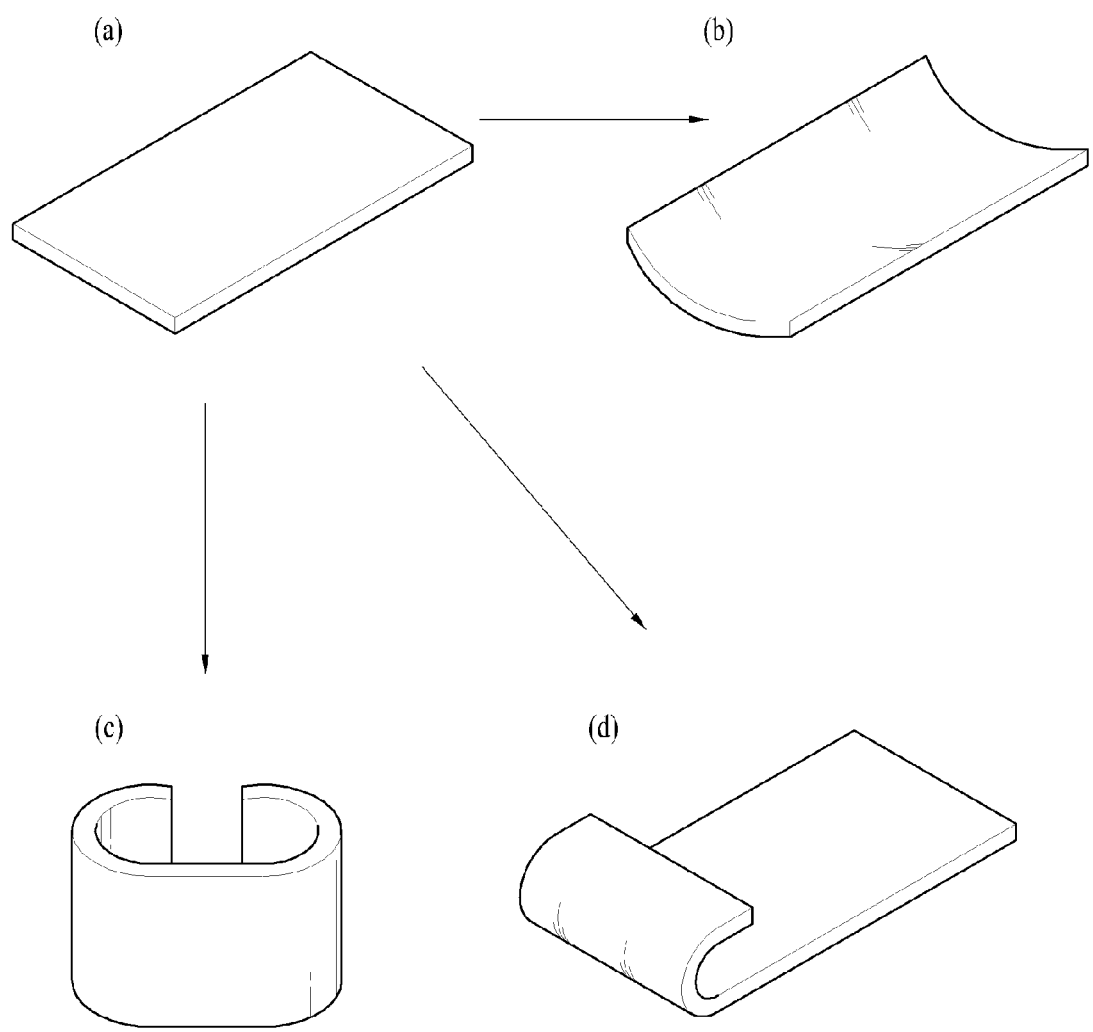
FIG. 5 is a view showing a flexible portable device according to an embodiment of the present invention.

FIG. 5 is a view showing a flexible portable device according to an embodiment of the present invention.

The drawings of FIG. 5 show a flexible display. Also, in a case in which the portable device is flexible, the flexible portable device may include the flexible display. Hereinafter, an example of a portable device which is flexible, i.e. a flexible portable device, will be described in detail.

Although FIG. 5 and subsequent drawings briefly show the shape of the flexible portable device, the flexible portable device shown in FIG. 5 and subsequent drawings include the units shown in FIG. 1.

FIG. 5(a) shows the flexible portable device before the flexible portable device is bent. Based on flexibility of the flexible portable device, the flexible portable device may be classified as a bendable device as shown in FIG. 5(b), a rollable device as shown in FIG. 5(c), or a foldable or paper-like device as shown in FIG. 5(d). Such classification is based on flexibility of a display or a device. Consequently, the above-mentioned devices may be regarded as bendable devices. Hereinafter, the device will be described on the assumption that bending of the device includes rolling or folding of the device.

In a case in which the device is bent as shown in FIGS. 5(b) to 5(d), the device may be malfunction according to the sensing result of the motion sensor. In particular, in a case in which a portion of the device at which the motion sensor is mounted is bent from a state shown in FIG. 5(a), motion of the device may be sensed unlike real motion of the device.

Figure 6:
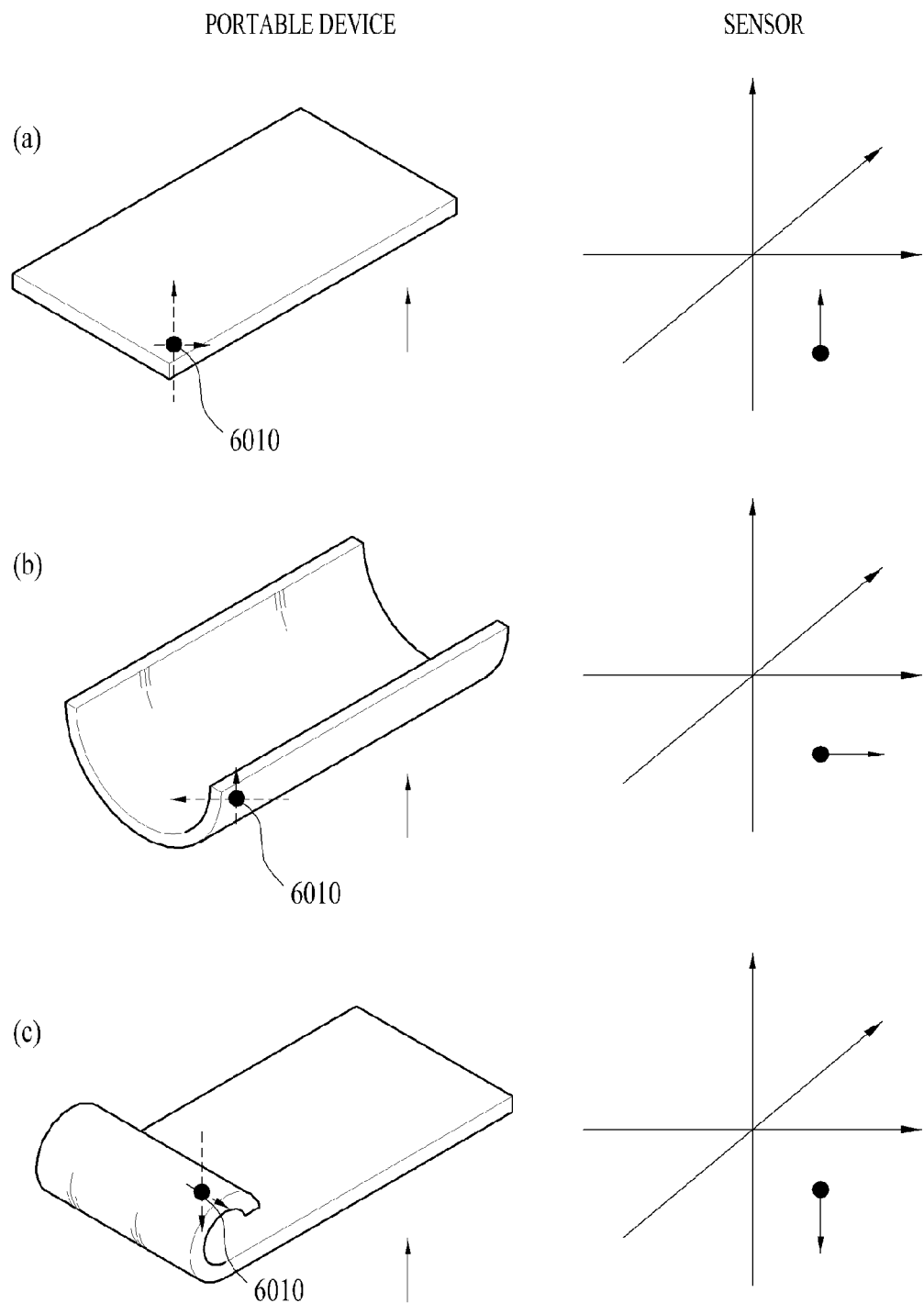
FIG. 6 is a view showing a motion sensing operation of the flexible portable device according to the embodiment of the present invention.

FIG. 6 is a view showing a motion sensing operation of the flexible portable device according to the embodiment of the present invention.

FIG. 6 shows that, when a user moves the device upward along a z axis, motion of the device is sensed by a motion sensor. The left side of the drawing shows bent shapes of the flexible device, and the right side of the drawing shows motion of the flexible device, which is bent as shown in the left side of the drawing, sensed and detected by the motion sensor. In an embodiment, a motion sensor 6010 is mounted at the right side lower end of the device as shown in the drawing.

In the motion sensor 6010 shown in each left drawing of FIG. 6, dotted line arrows indicate reference directions of the motion sensor. A long dotted line arrow indicates a reference upward and downward direction of the motion sensor, and a short dotted line arrow indicates a reference right and left direction of the motion sensor.

In a case in which the device is moved upward along a z axis as shown in the left drawing of FIG. 6(a), the motion sensor 6010 may sense the upward movement of the device along the z axis as shown in the right drawing of FIG. 6(a). In FIGS. 6(b) and 6(c), however, the motion sensor may sense the movement of the device in different directions due to bending of the device.

In a case in which the flexible device is bent as shown in FIG. 6(b), the motion sensor is rotated by about 90 degrees in the counterclockwise direction due to bending of the device. As a result, the reference direction of the motion sensor is changed as shown in the drawing. Although the device is moved upward along the z axis as shown in the left drawing of FIG. 6(b), the motion sensor may sense the right movement of the device in an x axis direction as shown in the right drawing of FIG. 6(b).

Also, in a case in which the flexible device is folded as shown in FIG. 6(c), the motion sensor is rotated by about 180 degrees in a y axis direction due to bending of the device. As a result, the reference direction of the motion sensor is changed as shown in the drawing. Although the device is moved upward along the z axis as shown in the left drawing of FIG. 6(c), the motion sensor may sense the downward movement of the device in a z axis direction as shown in the right drawing of FIG. 6(c).

The portable device is flexible. When the portable device is bent by the user, therefore, the motion sensor may be affected by bending of the portable device depending upon the location of the motion sensor. The bending of the portable device changes a reference plane or reference axis of a flexible area. When the motion sensor is located at the bent portion of the portable device, therefore, the motion sensor may recognize the bending of the device as motion of the user or motion of a surrounding environment. Otherwise, the motion sensor may incorrectly recognize the movement of the bent device as described with reference to FIG. 6. Therefore, a method of disposing the motion sensor that is capable of preventing or minimizing the occurrence of a sensing error of the motion sensor due to bending of the flexible portable device will hereinafter be described in detail. In other words, the method how to locate the motion sensor unit at a first area of the flexible portable device where the motion sensor unit is least influenced when the flexible is bent will be described.

FIG. 7 is a view showing a portable device according to an embodiment of the present invention.

As shown in FIG. 7, the portable device includes a flexible area and a nonflexible area. The nonflexible area is shaded. The nonflexible area can be called as non-bendable area.

The portable device may be differently bent depending upon flexibility of elements constituting the device. In other words, nonflexible elements of the device may be disposed at a specific area. Hereinafter, such a specific area may be referred to as a nonflexible area. As shown in FIG. 7(a), the portable device includes a nonflexible area 7010 provided at the middle thereof. Alternatively, the portable device includes a plurality of nonflexible areas 7020 and 7030 as shown in FIG. 7(b).

In a case in which the portable device includes at least one nonflexible area as shown in FIG. 7, the motion sensor may be disposed at the nonflexible area. In a case in which a plurality of nonflexible areas 7020 and 7030 are provided as shown in FIG. 7(b), the motion sensor may be disposed at the nonflexible area 7030 included in a main body of the portable device. The main body is a portion including the principal elements of the portable device. In particular, the main body means a portion of the portable device that is not variable by a user when the user uses the portable device. In a normal case, the main body may means a portion having the largest size among a plurality of dividable areas of the portable device. That is, in a case in which the portable device has two nonflexible areas divided from each other by a flexible area as shown in FIG. 7(b), the area having the largest size may constitute the main body. The main body may include a larger number of elements than the remaining portions of the portable device. In a case in which the motion sensor is disposed at the nonflexible area, the influence of bending of the portable device on the motion sensor may be avoided or minimized although the portable device is bent.

FIG. 8 is a view showing a portable device according to another embodiment of the present invention.

Specifically, FIG. 8(a) shows a portable device including a rollable display received therein so that the rollable display can be extended outward from the portable device when the rollable display is used, and FIG. 8(b) shows a portable device including a rollable display received therein in a state in which the rollable display is partially exposed so that the rollable display can be extended outward from the portable device when the rollable display is used.

As shown in FIG. 8, the portable device includes a main body 8010 or 8020 in which the flexible display is received. The main body is not flexible. Therefore, the main body corresponds to the nonflexible area described with reference to FIG. 7. In a case in which the portable device is configured as shown in FIG. 8, the main body may be less moved in direction or position than an extendable portion of the portable device or a sub body located at the extendable portion of the portable device. That is, there is a high probability that the portable device is maintained in a predetermined reference direction when a user uses the portable device.

In a case in which the portable device is configured as shown in FIG. 8, the present invention proposes an embodiment in which a motion sensor is disposed at the main body of the portable device, in which the display is received. In a case in which the motion sensor is disposed at the main body of the portable device, in which the display is received, i.e. a nonflexible area, the influence on the motion sensor may be avoided or minimized although the display of the portable device is extended.

FIG. 9 is a view showing a portable device according to another embodiment of the present invention.

FIG. 9 shows a reference bending axis area of a portable device which is bendable. The portable device may have a bending axis area which is bent according to flexibility of the device. For example, in a case in which the device is bent in the horizontal direction as shown in FIG. 9(a), the device may have a bending axis area corresponding to a vertical shaded portion. Alternatively, in a case in which the device is bent in the vertical direction as shown in FIG. 9(b), the device may have a bending axis area corresponding to a horizontal shaded portion. FIGS. 9(c) and 9(d) show a case in which the device is twisted. The device may be provided at the middle portion thereof in the horizontal direction with a bending axis area corresponding to a horizontal shaded portion. Alternatively, the device may include a plurality of bending axis areas as shown in FIGS. 9(e) and 9(f). FIG. 9(e) shows a case in which bending axis areas are provided at the middle portions of the device in the horizontal direction and in the vertical direction, and FIG. 9(f) shows a case in which bending axis areas are provided at the middle portions of the device in diagonal directions. The device may include a larger number of bending axis areas than the illustrated examples. In a case in which flexibility of the device is not uniform, the bending axis area may mean an area including the largest number of portions having low flexibility. In a case in which flexibility of the device is uniform, the bending axis area may mean a reference axis along which the device is bent according to the shape of the device when the user uses the device as shown in FIGS. 9(a) to 9(d). The bending axis area may be provided in a direction perpendicular to the bending direction of the device or at the interface between a flexible area and a nonflexible area.

The bending axis area shown in FIG. 9 may serve as an axis along which the user bends the device. Alternatively, the device may be designed to have such a bending axis area so that the user can bend the device in a direction perpendicular to the bending axis area in a corresponding axis direction. In other words, elements having low flexibility may be disposed at the bending axis of the device so that the user can bend the device along the corresponding axis. The bending axis area may be a portion, the position or direction of which is less changed with respect to that of the device before bending when the device is bent. In other words, the flexible portable device may have at least one bending axis area which includes a position that is least changed with respect to that of the flexible portable device before bending and after bending the portable device. In a case in which the motion sensor is disposed at the above-mentioned portion, therefore, the occurrence of an error of the motion sensor due to bending of the device may be avoided or minimized.

In a case in which the device has one bending axis area, the motion sensor may be disposed at the shaded portion shown in FIGS. 9(a) to 9(c). In a case in which the device has a plurality of bending axis areas, the motion sensor may be disposed at an intersection between the bending axis areas. That is, the motion sensor may be disposed at any one of the bending axis areas. In this case, however, the influence due to bending occurred in the other bending axis area cannot be avoided. In a case in which the device has a plurality of bending axis areas, therefore, the motion sensor is disposed at the intersection between the bending axis areas to avoid or minimize the influence due to bending simultaneously occurring along a plurality of bending axes. For example, as shown in FIG. 9(e) or 9(f), the motion sensor may be disposed at a center area at which the bending axes intersect.

On the other hand, in a case in which the bending axes cannot be divided based on the physical property (flexibility) of the device, the bending axes or the position of the motion sensor may be set in consideration of a bending method expected to be most frequently used according to the shape of the device. In this case, the motion sensor may be disposed at the center area of the device.

FIG. 10 is a view showing a control operation of a device according to a further embodiment of the present invention.

FIG. 10(a) shows a flexible portable device 10010 which is executing a position and direction based application. In FIG. 10, a constellation application for displaying a constellation existing in a direction indicated by the device at the position of a user is shown as an example of the position and direction based application.

As previously described, the position, direction, and angle of the device may be recognized using a motion sensor. For example, the position of the user on the earth may be recognized using a GPS sensor, and the orientation of the device or the user may be recognized using a geomagnetic sensor. Also, an angle between the device and the surface of the earth may be recognized using a gravity sensor or an inclination sensor. Consequently, the device 10010 may display a star chart of a constellation located at a position indicated by the device, which is being used by the user, using the constellation application, as shown in FIG. 10(a). Upon changing the direction in which the device 10010 is directed or the angle at which the device 10010 is directed, such motion of the device 10010 may be recognized, and the device 10010 may display a star chart, coordinates of which have been changed.

FIGS. 10(b) and 10(c) show a case in which the device that is executing the constellation application is intentionally or unintentionally bent by a user.

In an embodiment, in a case in which the device is bent as shown in FIG. 10(b), a geomagnetic sensor for sensing orientation may be disposed at the right side of the bent device. In this case, the device may recognize that the orientation of the device has been changed although the direction or orientation in which the user faces the display is not changed. In this case, therefore, the device 10020 may determine that a direction change motion has occurred in the right direction rather than in a direction intended by the user with the result that the device may display the right side part of the constellation. However, the device 10020 is merely bent in a state in which the main direction of the device is not changed. For this reason, the device must display an image as shown in FIG. 10(a).

FIG. 10(c) shows a case in which a portable device including a motion sensor according to an embodiment of the present invention is used. As shown in FIG. 10(c), the user may intentionally or unintentionally bend a device 10030. In the portable device according to the present invention, however, the motion sensor is disposed at a portion of the portable device at which the influence of bending of the device on the motion sensor is avoided or minimized. For this reason, display control as shown in FIG. 10(b) according to bending of the device may not be performed. In a case in which the device is bent as shown in FIG. 10(c), therefore, the changed direction is not sensed by the motion sensor with the result that the same display as shown in FIG. 10(a) may be maintained.

In another embodiment, in a case in which the motion sensor detects motion equal to or less than a predetermined first threshold value, it may be determined that such motion has occurred by bending the device, with the result that the detected motion may be ignored or bypassed. In other words, in a case in which a sensing value of a motion sensing unit is equal to or less than the first threshold value, the portable device may determine that the sensed motion has occurred due to bending of the device, and therefore, the device may not be controlled based on the motion.

Also, the portable device may further include a bending sensor unit for detecting whether the device has been bent in a case in which motion having a sensing value equal to or less than a second threshold value has been detected to determine whether such motion has occurred due to bending of the device. When motion of the portable device equal to or less than the second threshold value has been detected, and the bending sensor unit detects that the device has been bent, it is determined that the detected motion has occurred due to bending of the device with the result that the operation corresponding to the motion may not be performed, or the motion may be ignored or bypassed. Even in a case in which the position of the motion sensor unit does not completely avoid the influence due to the bending of the device, therefore, the sensing value of the motion sensor unit due to the bending of the device is not reflected in controlling the device, whereby it is possible to minimize or prevent malfunction of the device based on sensing of the motion according to bending of the device. In this case, the second threshold value may be equal to or greater than the first threshold value. That is, instead of increasing the threshold value, whether the device has been bent may be further detected to more accurately control the device.

The first threshold value and the second threshold value may be used together. That is, if motion equal to or less than the first threshold value is detected, the device may ignore or bypass the motion. If motion greater than the first threshold value and equal to or less than the second threshold value is detected, it may be determined whether the motion has occurred due to bending of the device using the bending sensor. In a case in which the motion has occurred due to bending of the device, the motion may be ignored or bypassed. On the other hand, in a case in which the motion has not occurred due to bending of the device, the device may be controlled based on the motion.

In the embodiment of the present invention, the portable device may include the bending sensor as previously described to sense the occurrence of bending, bending direction, and bending degree. Also, the bending of the portable device may be mapped as a gesture of the user so that the portable device can be controlled based thereupon. In this case, the bending of the portable device may be referred to as a bending gesture that can be input by the user. In connection with the above-mentioned bending axis area, the bending gesture may be mapped in a state in which the bending gesture is divided based on the bending axis area. In a normal case, the bending gesture may be input in a direction perpendicular to the bending axis area. As described with reference to FIG. 9, operations of bending the portable device may be mapped with user input as bending gestures based on the bending axis area. In a case in which a plurality of bending axis areas is provided, therefore, a plurality of bending gestures may be used.

Display control may be performed based on a bending gesture according to an application executed by the portable device. For example, in a case in which a media player is driven in the portable device, bending of the right side of the device may be mapped as forwarding, bending of the left side of the device may be mapped as rewinding, and the device may be controlled based thereupon. In another embodiment, in a case in which an image, such as a document, is displayed by the portable device, upward, downward, left, and right bending of the portable device may be mapped as scroll directions of the document so that the display image can be scrolled according to the bending of the portable device.

As is apparent from the above description, a portable device including a flexible display or a portable device which is configured to be flexible according to the present invention can be accurately operated and controlled irrespective of flexibility thereof.

Also, although a flexible portable device is bent, influence due to bending of the flexible portable device is avoided or minimized, and therefore, the flexible portable device can be accurately operated.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A flexible portable device comprising:
a display unit configured to display an image;
a sensor unit configured to detect a bending of the flexible portable device and a movement of the portable device,
wherein the sensor unit includes a motion sensor configured to detect the movement of the portable device and the motion sensor is locally disposed in a bending axis area at a position that is less changed in sensing with respect to that of the flexible portable device before bending and after bending the flexible portable device, such that an influence of bending on the motion sensor is minimized; and
a control unit configured to: detect, via the sensor unit, the bending of the flexible portable device,
detect, via the motion sensor, the movement of the flexible portable device due to the bending of the flexible portable device, and
ignore or bypass a value of the detected movement of the flexible portable device due to the bending of the flexible portable device if the value of the detected movement of the flexible portable device is equal to or lower than a predetermined threshold value.

2. The flexible portable device according to claim 1, wherein a reference plane or a reference axis of a bendable area of the flexible portable device is changed by bending the bendable area.

3. The flexible portable device according to claim 1, wherein the bending axis area is located at a center area of the flexible portable device.

4. The flexible portable device according to claim 1, wherein the flexible portable device further has at least one nonflexible area which is non-bendable.

5. The flexible portable device according to claim 1, wherein the bending axis area includes a position that is least changed with respect to that of the flexible portable device before bending and after bending the portable device.

6. The flexible portable device according to claim 5, wherein the bending axis area has lower flexibility than the remaining areas of the flexible portable device.

7. The flexible portable device according to claim 5, wherein, when the flexible portable device has a plurality of bending axis areas, the motion sensor is located at an intersection between the bending axis areas.

8. The flexible portable device according to claim 1, wherein the control unit controls the display unit through sensing performed by the motion sensor.

9. The flexible portable device according to claim 1, wherein the motion sensor comprises at least one selected from among an inclination sensor, a geomagnetic sensor, a gravity sensor, a gyro sensor, an acceleration sensor, and a camera sensor.

10. The flexible portable device according to claim 1, wherein the flexible portable device is realized by at least one selected from among a bendable type device, a foldable type device, and a rollable type device.

11. The flexible portable device according to claim 1, wherein the control unit controls the flexible portable device according to a bending gesture with respect to the flexible portable device based on the bending axis.

* * * * *